Sept. 17, 1929.  H. W. TOBEY  1,728,812
APPARATUS FOR LINE WELDING
Filed Aug. 10, 1923  2 Sheets-Sheet 1
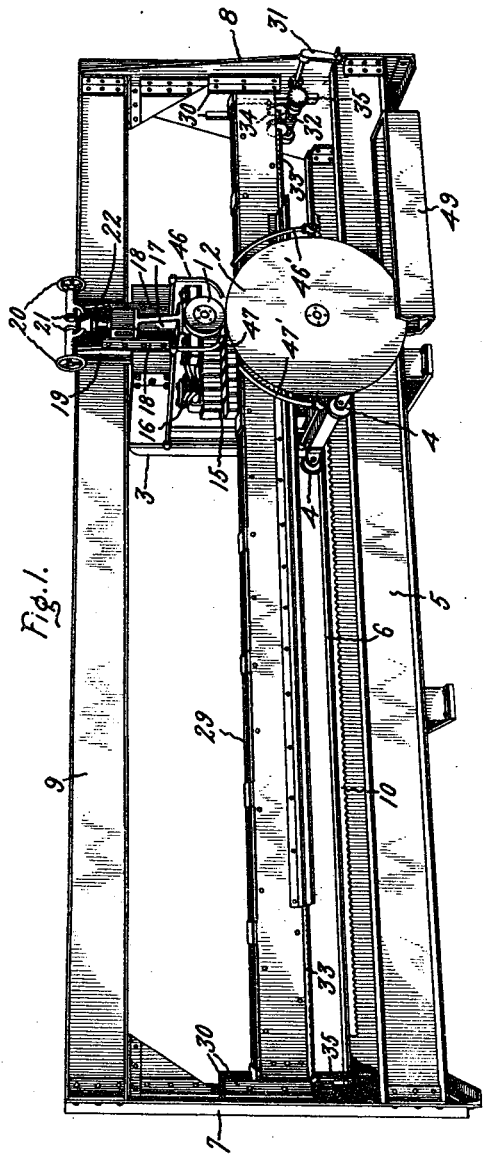
Inventor:
Harry W. Tobey,
by (signature)
His Attorney Sept. 17, 1929.  H. W. TOBEY  1,728,812
APPARATUS FOR LINE WELDING
Filed Aug. 10, 1923  2 Sheets-Sheet 2
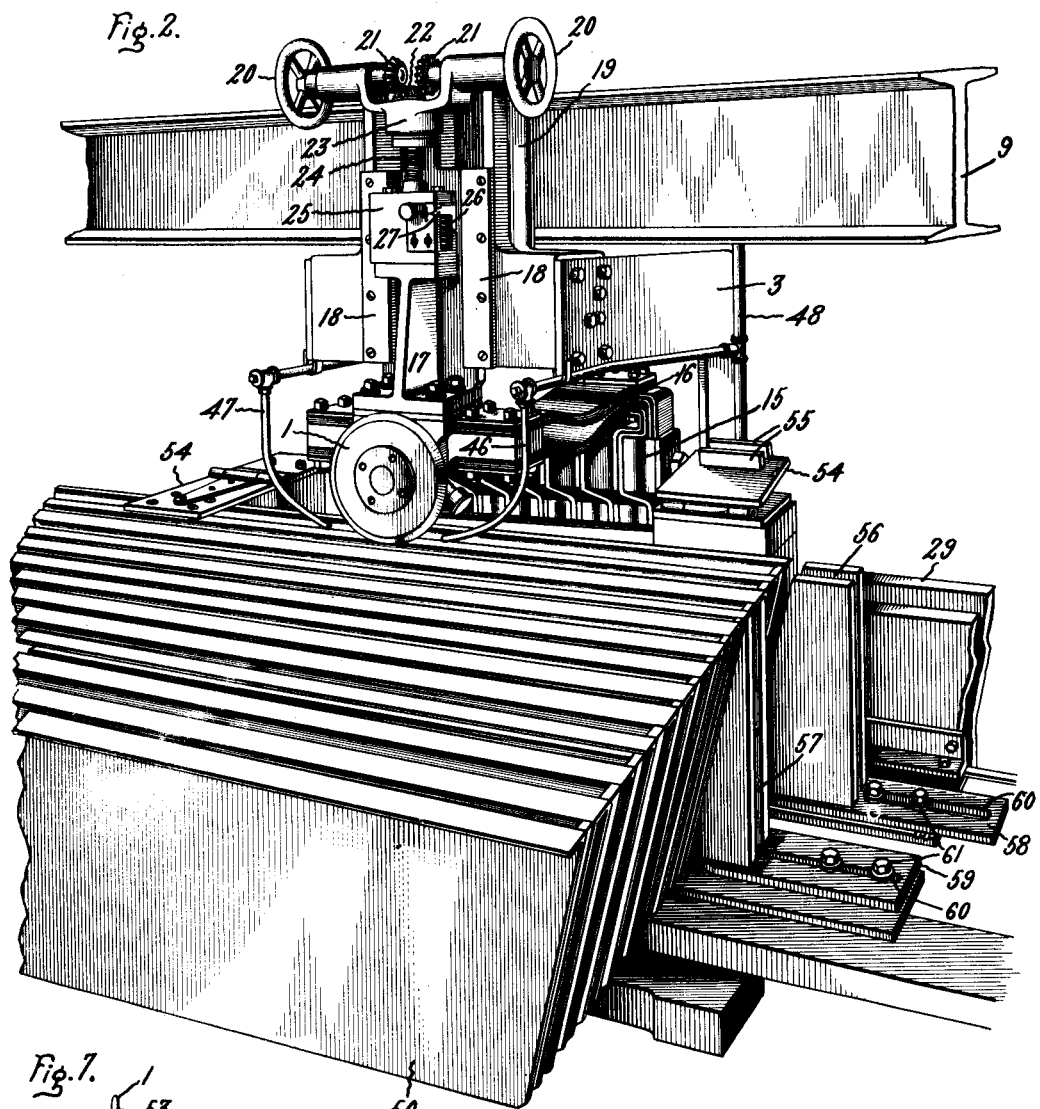
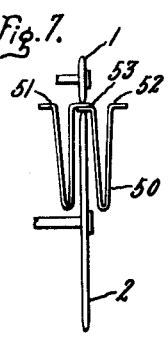
Inventor:
Harry W. Tobey,
by
His Attorney Patented Sept. 17, 1929

1,728,812

UNITED STATES PATENT OFFICE

HARRY W. TOBEY, OF PITTSFIELD, MASSACHUSETTS, ASSIGNOR TO GENERAL ELECTRIC COMPANY, A CORPORATION OF NEW YORK

APPARATUS FOR LINE WELDING

Application filed August 10, 1923. Serial No. 656,729.

My invention relates to electric welding and more particularly to improvements in welding machines of the type wherein the work is heated by an electric current conducted therethrough by means comprising a rotatable disk electrode which is forced against the work and movable with respect to the work to produce a line weld.

An object of my invention is to provide an apparatus which shall be particularly adapted for making comparatively long welds in relatively heavy work and which shall be rugged in construction, reliable in operation and which shall embody a simple and effective arrangement for cooling the electrodes and work.

My invention will be better understood from the following description taken in connection with the accompanying drawings and its scope will be pointed out in the appended claims.

In the drawings, Fig. 1 is a perspective view of the welding machine; Fig. 2 is a view showing the machine with the parts in position for welding deeply corrugated work; Fig. 3 is a view showing the mounting and driving arrangement of the movable carriage which carries the welding electrodes; Figs. 4 and 5 are fragmentary views showing a detail of construction; Fig. 6 is a sectional view showing how the welding electrodes are mounted and lubricated and Fig. 7 is a view showing how the electrodes of Fig. 2 engage the work.

Referring to Figs. 1 and 2, the rotatable disk electrodes 1 and 2 are mounted in bearings supported on the arms of a U-shaped frame 3. The frame 3 is provided with rollers 4 bearing on members shown as channels 5 and 6 supported on end frames 7 and 8. An I-beam 9 is arranged parallel to the channels 5 and 6 and above the same, and cooperates with the channels to provide a supporting and driving means for the carriage comprising the frame 3. The channels and I-beam provide guide-ways for the carriage. In the arrangement illustrated, the channels 5 and 6 are each provided with a rack 10 and the I-beam 9 is provided with a rack 11. A motor 12 mounted on the carriage, through suitable gearing, as indicated, drives a pair of pinions 13 which engage the racks 10 and a pinion 14 which engages rack 11. The carriage is thus driven at three points so that force is exerted upon the carriage in three lines in two different planes thereby causing the carriage to travel true and without binding.

Welding current is supplied to the electrodes from a transformer 15 shown in Figs. 1 and 2 mounted upon and arranged to move with the carriage. One terminal of the secondary winding of the transformer is connected by flexible leads 16 to the block carrying the upper electrode 1. The other terminal of the secondary winding, not shown, is similarly connected to a block which carries the lower electrode 2. The bearing supporting the upper electrode is arranged to be raised and lowered to vary the distance between the electrodes 1 and 2 and thereby the pressure upon the work which these electrodes engage from opposite sides as shown in Figs. 2 and 7. As shown in Figs. 1 and 2, the bearing block for the upper electrode is secured to a member 17, suitably insulated from the bearing block and slidably mounted in ways 18 provided on the frame 3. The frame 3 is also secured to a guide block 19 arranged to cooperate with the I-beam 9 to assist in guiding the carriage in its line of travel. A pair of hand wheels 20 operate bevel-gears 21, which engage a bevel-gear 22 which is secured to a revolving nut mounted in the part 23 and engaging a screw 24. The screw 24 is secured to a cross-piece located in a box-like structure 25 so that the screw is movable vertically but is held against rotation. A pair of springs 26 are located in the box 25 and transmit pressure to the member 17 carrying the upper electrode bearing. By adjusting the hand wheels 20, electrode 1 may be raised and lowered and the pressure on the electrode during welding may be adjusted to any desired value. An indicator 27 cooperating with a suitable scale may be provided to indicate the pressure upon the electrode.

It is apparent that when the electrodes are forced against the work by adjustment of the hand wheels 20 the reaction tends to separate the arms of the U-shaped frame. In order to prevent distortion of the frame in this manner the upper arm of the U-shaped frame is provided with rollers 28 shown in Figs. 4 and 5 which engage the I-beam 9. Normally these rollers clear the I-beam by a small fraction of an inch but as soon as pressure is applied to the electrodes the rollers engage the I-beam. This construction makes it possible to use a comparatively light construction for the frame 3 since the I-beam cooperates with the channels 5 and 6 to prevent distortion of the frame 3. Since the arrangement provides a rigid construction for the frame the electrodes 1 and 2 will always remain in proper alignment.

The work to be welded may be supported on a table 29 passing transversely through the U-shaped frame. The ends of the table 29 are guided in ways 30 secured to the end frames 7 and 8 and the table may be raised and lowered by means of a handle 31 arranged through suitable gearing 32 to operate a shaft 33 carrying pinions 34 engaging racks 35 at the ends of the table 29. Since the table 29 and shaft 33 pass through the loop comprising the secondary winding of the transformer and the electrodes they are preferably constructed of brass so that they will be non-magnetic and have no tendency to produce a low reluctance path for magnetic flux.

The electrodes are supported in bearing blocks as shown in Fig. 6. The bearing block 36 is lined with an alloy bushing 37 in which the copper shaft or trunnion 38 turns. The bushing is provided with an annular groove 39 connected through opening 40 with a lubricating cup 41. The annular recess or groove 39 furnishes means for supplying the bearing with lubricating material and enables such material to be forced uniformly throughout the entire bearing surface. The shaft 38 is retained in its bearing by means of a nut 42 locked by a set screw 43. The copper electrode 1 which slips over a threaded projection on the shaft 38 is secured in place by means of a nut 44. Pins 45 are provided to prevent the electrode from turning on the shaft 38.

The arrangement whereby the upper electrode may be raised and lowered has been described. The lower electrode may be secured in any desired position by blocking up the lower bearing block to any desired extent to accommodate different sizes of electrode disks. In the arrangement illustrated the lower electrode is much larger than the upper electrode to enable the machine to weld deeply corrugated work, but it is apparent that the machine may also be used for ordinary flat work and that the electrode disks may be of the same diameter if desired.

For any given size of electrodes the line of the work may be adjusted so as to move along the point at which the electrodes engage each other by adjusting the position of the table 29.

It is very essential that the electrodes and work be properly cooled since otherwise the work will buckle and the electrodes will tend to pick up metal from the work and also burn through the work. I have provided a very simple and effective cooling arrangement which brings about a uniform cooling about the spot where the welding is taking place. As shown in Figs. 1 and 2 I provide a pair of pipes 46 and 47 each arranged to direct a stream of cooling medium such as water to impinge upon the upper electrode and the work in the plane of the weld. The pipe 46 directs a stream of cooling medium to impinge at the point where the electrode is turning into contact with the work and the pipe 47 directs its stream to impinge at the point where the electrode is turning out of contact with the work. A similar pair of pipes 46' and 47' are provided for supplying cooling medium to impinge in a similar manner upon the spot where the lower electrode engages the under side of the work. The cooling medium is supplied to the discharge pipes through a pipe 48 which may be supplied from a pump, not shown, mounted upon the base of the machine. As shown in Fig. 1 a trough 49 is provided to catch the cooling medium and this trough may be connected to the circulating pump so that a continuous circulation of cooling medium is provided.

In Fig. 2 the machine is shown welding deeply corrugated work 50, the particular job shown being the welding together of sections of a transformer casing. The cooperation of the electrodes with the work is shown more clearly in Fig. 7 wherein the two corrugated sections 51 and 52 of the work are arranged with overlapping projecting flanges 53 which are engaged on their upper side by the electrode 1 and on their under side by the electrode 2. As the electrodes move along the work the current passing between the electrodes heats the work and the pressure between the electrodes forces the sheets to be welded together so that a line weld is produced. After two sections are welded together the work 50 is moved laterally so that another section of the work may be placed in the machine and welded to the section of the work already completed. A conveyor not shown, or other suitable support may be used to support the work 50 so that it may be moved laterally when it is desired to insert a new section. In this way the corrugated work may be built up to any desired size after which the work may be bent into circular form and the adjacent edges welded together by arc welding or in any other suitable way to form a circular tank.

In order to locate the sections to be welded in proper position with respect to the electrodes, hinged spacing devices 54 provided with projections 55 to engage the work are arranged on the table 29. In order to hold the corrugated sections firmly in place during welding blocks 56 and 57 are arranged to engage the corrugations in the work and these blocks are supported on members 58 and 59 provided with slots 60 so that the blocks may be moved into position and clamped by bolts 61. After locating the sections of the work in position, the hinged spacing devices 54 are thrown back so that the electrodes have a free line of travel over the length of the weld.

In order to make a perfect weld it is desirable to tack the sections of the work together at several places along the line of the weld before the line weld is made. This may be done by arc welding but preferably this work is done by the machine itself in the following manner. The carriage is moved to the point where it is desired to tack the plates together and the electrodes are forced against the work. The current is then turned on momentarily and a weld is made at the spot desired. Such tack welds may be made near each end of the work and at one or more places between the ends of the work. The carriage is then run to one end of the work and the line weld then made in one continuous movement of the carriage from this end to the other end of the work.

The work is preferably sand-blasted to clean the same along the line to be welded. In the particular job shown in Fig. 2, the corrugations were about 12 inches deep and the weld between 9 and 10 feet long. The stock was about $\frac{1}{16}''$ thick and the speed of welding about 42 inches per minute, the current being about 12,000 amperes and the pressure between the electrodes in the neighborhood of 600 to 800 pounds. By reason of the effectiveness of the cooling arrangement and the rigidity and alignment of the carriage supporting the electrodes, merely occasional redressing of the electrodes is required.

What I claim as new and desire to secure by Letters Patent of the United States, is,—

1. A welding machine comprising an electrode for pressing upon and conducting welding current into the work, a carriage movable with respect to the work and providing a mounting for said electrode whereby the electrode may be moved along the work to produce a line weld, and means for moving said carriage, comprising means exerting force in three parallel noncoplanar lines whereby binding and distortion are effectively resisted.

2. A welding machine comprising a pair of rotatable disk electrodes arranged to press upon opposite sides of the work and conduct welding current therethrough, a carriage movable with respect to the work, said electrodes being mounted on said carriage whereby the electrodes may be moved along the work to produce a line weld and means for moving the carriage along the work comprising gearing arranged to exert force in three parallel lines and in more than one plane.

3. A welding machine comprising a pair of rotatable disk electrodes arranged to be forced against opposite sides of the work and lead welding current therethrough, a carriage comprising a frame movable with respect to the work and provided with bearings supporting said electrodes, means comprising members provided with guideways along which said carriage is arranged to move, said members being located so as to engage and protect said frame against damage from distortion by the forces produced when said electrodes are forced against the work.

4. A welding machine comprising a pair of rotatable disk electrodes arranged to contact with opposite sides of the work and lead welding current therethrough, a carriage comprising a U-shaped frame movable with respect to the work and provided with bearings for the electrodes mounted on the arms of the U-shaped frame, means for moving one of said bearings with respect to its supporting arm to exert pressure between the electrodes upon the work, and means arranged to support and guide said carriage during its movement along the work comprising members provided with surfaces along which said carriage moves arranged to engage and protect said frame from distortion by the forces tending to separate the arms of said U-shaped frame when said electrodes are forcibly pressed against the work.

5. A welding machine comprising a pair of rotatable disk electrodes arranged to contact with opposite sides of the work and leading welding current therethrough and move with respect to the work to produce a line weld, a U-shaped frame member provided with bearings for the electrodes mounted on the arms thereof, means for moving one of said bearings with respect to its supporting arm to exert pressure between the electrodes upon the work, a supporting structure for said frame member comprising three guide members arranged transversely to the length of the arms of the U-shaped member, two of said guide members being substantially in a horizontal plane below the lower arm of said U-shaped frame and the third being above the upper arm, and rollers on said frame adapted to engage each of said guide members whereby the frame is protected from distortion when said electrodes are forcibly pressed together.

6. A welding machine as claimed in claim 5 having in combination means comprising gearing for producing the movement of the frame carrying the electrodes along the work including a rack on each guide member.

7. A welding machine comprising a pair of rotatable disk electrodes arranged to press upon opposite sides of the work and lead welding current therethrough, a carriage comprising a U-shaped frame supporting said electrodes on the arms of said frame, said carriage being arranged to move with respect to the work to produce a line weld, a welding transformer carried by said frame and provided with a winding for supplying welding current to said electrodes, and a non-magnetic work supporting member extending through said U-shaped member.

In witness whereof, I have hereunto set my hand this 4th day of August, 1923.

HARRY W. TOBEY.